(12) United States Patent
Kingston

(10) Patent No.: US 6,641,223 B2
(45) Date of Patent: Nov. 4, 2003

(54) ARTICULATED HAULER

(75) Inventor: Tim Kingston, Eskilstuna (SE)

(73) Assignee: Volvo Articulated Haulers AB, Växjö (SE)

( * ) Notice: Subject to any disclaimer, the term of this patent is extended or adjusted under 35 U.S.C. 154(b) by 0 days.

(21) Appl. No.: 10/063,314

(22) Filed: Apr. 10, 2002

(65) Prior Publication Data

US 2003/0001426 A1 Jan. 2, 2003

Related U.S. Application Data

(63) Continuation of application No. PCT/SE00/01968, filed on Oct. 11, 2000, now abandoned.

(30) Foreign Application Priority Data

Oct. 11, 1999 (SE) .................................................. 9903644

(51) Int. Cl.$^7$ .................................................. B60P 1/64
(52) U.S. Cl. ........................ 298/22 P; 298/7; 298/17 R; 298/22 R; 180/235; 180/242; 280/442
(58) Field of Search .......................... 298/7, 8 T, 17 R, 298/22 R, 22 P; 180/418, 235, 242, 307, 308; 280/442

(56) References Cited

U.S. PATENT DOCUMENTS

| | | | | |
|---|---|---|---|---|
| 3,211,498 A | * | 10/1965 | Peller ......................... | 298/22 P |
| 3,890,005 A | * | 6/1975 | Sien .......................... | 298/22 P |
| 3,910,369 A | * | 10/1975 | Chichester et al. | |
| 3,993,158 A | * | 11/1976 | Weight et al. | |
| 4,470,475 A | * | 9/1984 | Carlson | |
| 4,947,956 A | * | 8/1990 | Henline | |
| 4,966,242 A | * | 10/1990 | Baillargeon | |
| 5,040,849 A | * | 8/1991 | Thomas et al. ........... | 298/22 R |
| 5,141,384 A | * | 8/1992 | Hvolka | |
| 5,167,292 A | | 12/1992 | Moiroux et al. | |
| 5,732,789 A | * | 3/1998 | Stephenson | |
| 6,116,697 A | * | 9/2000 | Smith et al. ............... | 298/22 R |
| 6,227,326 B1 | * | 5/2001 | Kowalyk et al. | |
| 6,336,683 B1 | * | 1/2002 | Akiba ......................... | 298/8 T |

FOREIGN PATENT DOCUMENTS

DE          2450573 A1    5/1976

* cited by examiner

*Primary Examiner*—Stephen T. Gordon
(74) *Attorney, Agent, or Firm*—Howrey Simon Arnold & White LLP

(57) ABSTRACT

An articulated hauler, such as a dumper, is disclosed. The hauler includes a vehicle part housing or carrying the drive engine, and a load-bearing vehicle part. The vehicle parts are pivotably interconnected about a vertical pin. The load-bearing vehicle part is provided with at least one first wheel axle driven by the drive engine via a mechanical transmission is arranged at a first distance from the vertical pin. The vehicle part bearing the drive engine is provided with at least one second wheel axle driven by the drive engine. The second wheel axle is arranged at a second distance from the vertical pin. The second wheel axle on the vehicle part bearing the drive engine is also able to be driven via a hydrostatic transmission.

10 Claims, 4 Drawing Sheets

ARTICULATED HAULER

CROSS REFERENCE TO RELATED APPLICATIONS

The present application is a continuation of International Application No. PCT/SE00/01968, filed Oct. 11, 2000 and published in English pursuant to PCT Article 21(2), now abandoned, and which claims priority to Swedish Application No. 9903644-4, filed Oct. 11, 1999. The disclosures of both applications are expressly incorporated herein in their entirety by reference.

BACKGROUND OF INVENTION

1. Technical Field

The present invention relates to an articulated hauler or truck, such as a dumper. The truck includes a vehicle part having a drive engine and a load-bearing vehicle part. The vehicle parts are interconnected in an articulated manner about a vertical pin. The load-bearing vehicle part is provided with at least one wheel axle driven by the drive engine via a mechanical transmission and arranged at a distance from the vertical pin. The vehicle part with the drive engine is provided with at least one wheel axle driven by the drive engine and arranged at a considerably shorter distance from the vertical pin.

2. Background Information

It is previously known to provide an articulated truck such as a dumper with all-wheel drive in order to obtain good passability when driving on soft and/or slippery surfaces. To accomplish this, the drive line of the truck includes a front wheel axle arranged in a front vehicle part with a differential that, via a propeller shaft, is driven, via a distribution gearbox, by a gearbox arranged in the drive engine of the truck. The distribution gearbox also transmits the torque of the drive engine to a rear wheel axle differential arranged in a rear vehicle part via a second propeller shaft. In the event that the truck is provided with a second rear wheel axle, the torque of the drive engine is transmitted between the first rear wheel axle and the differential of the second rear wheel axle via a further propeller shaft arranged between the wheel axles. The differentials make it possible for the wheels on one and the same axle to cover distances of different length that may occur, such as when cornering and negotiating obstacles. As long as the wheels have a good grip, this works well. However, if the grip of one of the wheels on a wheel axle worsens, the wheel starts to slip, and the power of the drive engine is consequently led out to the slipping wheel. Accordingly, the grip of the slipping wheel decides the combined driving power of the two wheels. Against this background, a differential lock is usually arranged so as to lock the differential, making the wheels rotate at the same speed.

As known in the art, a longitudinal differential is also arranged between the front wheel axle of the front vehicle part and the rear wheel axle of the rear vehicle part in a manner corresponding to the differentials described above. This is done in order to make it possible for the wheels on the front and rear wheel axles to cover distances of different length, for example, when cornering or negotiating obstacles. As long as all wheels have a good grip, this works well. However, if the grip of the wheels on one wheel axle becomes worse (usually the front wheel axle in the case of a loaded vehicle), the wheels start to slip, and the power of the drive engine is then led out to the slipping wheel(s). The longitudinal differential is therefore also provided with a differential lock arranged so as to lock the differential, causing all the wheels to rotate at the same speed.

The above-mentioned differential locks are operated by the driver of the truck, who is therefore responsible for both engaging and disengaging the locks. As trucks of the above-mentioned type are often used on sites with very varied surfaces, for example, alternately mud and asphalt, frequent engagement and disengagement of the differential locks is required in order to avoid increased wear/stress on the transmission of the truck.

A particularly marked problem occurs in articulated trucks such as a dumper having a front vehicle part pivotally connected about a vertical pin to a rear vehicle part, where the rear vehicle part has a wheel axle arranged at a distance from the vertical pin, and the front vehicle part has a front wheel axle arranged at a considerably shorter distance from the vertical pin. During cornering, the wheels on the wheel axles run on considerably different turning radii. If the truck is driven through a curve with the longitudinal differential lock engaged, particularly when loaded and/or on a surface with good grip, the transmission is subjected to great restrained torques due the wheels on the front wheel axle trying to rotate at a higher speed than the wheels on the rear wheel axle. In addition to the stresses on the transmission, this also results in increased tire wear and an impaired driving feeling when the truck is under-steered, that is to say, tries to go straight on during cornering.

SUMMARY OF INVENTION

The present invention provides a solution to the above-mentioned problems by producing an articulated truck in which great restrained torques in the transmission of the truck associated with cornering, are avoided. This is achieved by providing an articulated lorry, such as a dumper, having a vehicle part containing the drive engine and a load-bearing vehicle part. The vehicle parts are pivotably interconnected about a vertical pin. The load-bearing vehicle part is provided with at least one first wheel axle driven by the drive engine via a mechanical transmission, with the axle being arranged at a distance from the vertical pin. The vehicle part bearing the drive engine is provided with at least one second wheel axle driven by the drive engine. This second wheel axle is arranged at a considerably shorter distance from the vertical pin than the first wheel axle. The second wheel axle is also driven via a hydrostatic transmission. As the first wheel axle on the load-bearing vehicle part is driven by the drive engine via a mechanical transmission, the driving torque of the drive engine is transmitted to those wheels which, when the vehicle is loaded, can be expected to have the best grip. At the same time, part of the driving torque of the drive engine can be transmitted to the second wheel axle, even during cornering, without great restrained torques arising.

According to a preferred embodiment of the invention, the hydrostatic transmission comprises a hydraulic pump driven by the drive engine and coupled to a hydraulic motor. The hydraulic motor is arranged for driving the second wheel axle, and is arranged at the differential of the second wheel axle. By arranging the hydraulic motor at the differential of the wheel axle, only one hydraulic motor is required for driving both wheels of the wheel axle, contributing to both weight-saving and simplified installation as relatively little space is required.

According to another preferred embodiment of the invention, the hydraulic pump is coupled to other hydraulic components arranged on the truck. This results in both weight-saving and simplified installation by virtue of the fact that fewer hydraulic pumps have to be accommodated in the space which is available in connection with the drive engine of the lorry.

According to another preferred embodiment of the invention, the hydraulic pump is coupled to tipping cylinders arranged for tipping a container arranged on the load-bearing vehicle part. This enables all of the oil flow delivered by the hydraulic pump to be used for propulsion when the truck is driven. When the truck is stationary, in connection with tipping, all of the oil flow is then available for the tipping cylinders.

According to another preferred embodiment of the invention, a coupling is arranged between the hydraulic motor and the second wheel axle for selective coupling of the hydraulic motor to the second wheel axle. This allows the driving wheels on the hydrostatically driven second wheel axle to be uncoupled, for example, when driving on roads, resulting in reduced transmission losses and, accordingly, reduced fuel consumption.

According to another preferred embodiment of the invention, the coupling is a toothed coupling that is preferably pneumatically operated between a coupled position and an uncoupled position. In this way, a robust coupling is obtained which can be engaged and disengaged during truck trips without being damaged.

According to another preferred embodiment of the invention, a detector is arranged so as to detect a driving situation in which the coupling is adapted so as to uncouple the hydraulic motor from the second wheel axle. By automating the engagement and disengagement of the drive to the second wheel axle based on the current driving situation, unnecessary driving with the drive engaged is avoided, resulting in reduced fuel consumption and reduced wear on the hydrostatic transmission. In this context, the detector is connected to an electronic control unit which engages or disengages the drive on the second wheel axle depending on the detected driving situation.

According to another preferred embodiment of the invention involving a driving situation concerning the speed of the tuck, the hydraulic motor is arranged so as to be uncoupled from the second wheel axle when a predetermined speed is exceeded. Another driving situation involves the current gear used in the gearbox of the truck. The above driving situations can be used as indicators that the truck is being driven under conditions wherein the drive of the second wheel axle is not required.

Further preferred embodiments and advantages of the invention can be understood by the following description.

BRIEF DESCRIPTION OF DRAWINGS

The invention will be described below with reference to preferred exemplary embodiments and the appended figures, in which.

DETAILED DESCRIPTION

Figure 1:
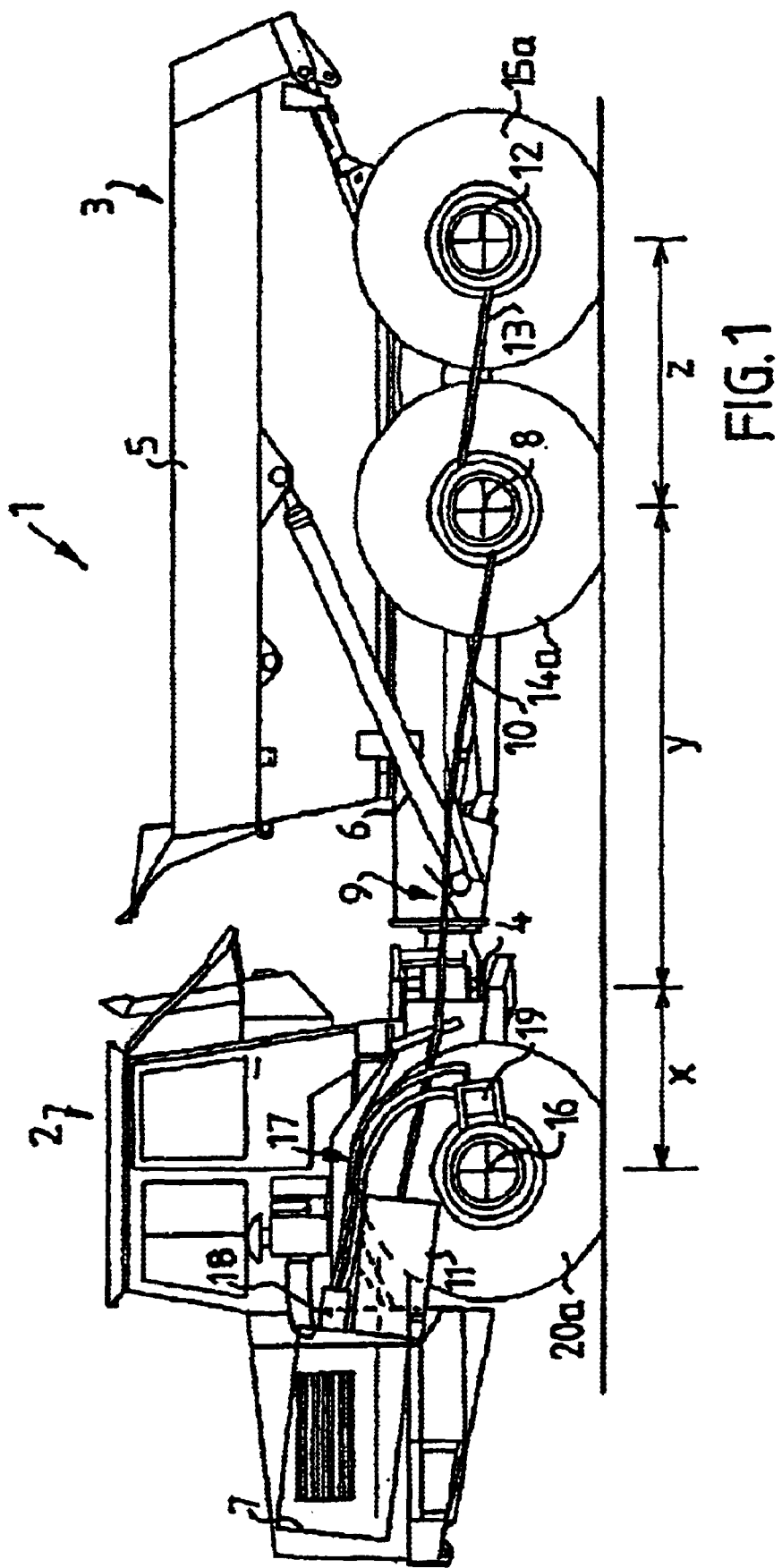
FIG. 1 shows a side view of an articulated truck according to the present invention.

FIG. 1 shows a side view of an articulated or articulated frame-steered truck 1, known as a dumper or dump truck, according to the present invention. The truck 1 has a front vehicle part 2 containing or housing the drive engine, and a rear load-bearing vehicle part 3 connected to the front vehicle part 2 via a vertical articulation pin 4. The load-bearing vehicle part 3 is also provided with a tippable container 5 which can be raised/tipped by hydraulic cylinders 6.

The front and rear vehicle parts 2 and 3 are also interconnected in an articulated manner about a horizontal pivot pin (not shown) so that the vehicle parts 2, 3 can be rotated in relation to one another about a longitudinal axis of the truck 1.

To steer the truck 1 when driven, the front vehicle part 2 pivots about the vertical articulation pin 4 by means of a pair of hydraulic cylinders (not shown), each being arranged on its own side of the articulation pin 4.

According to the present invention, the driving torque delivered by the drive engine 7 is transmitted to a first wheel axle 8 arranged on the load-bearing vehicle part 3 via a mechanical transmission 9. The transmission 9 includes a first propeller shaft 10 arranged between the gearbox 11 of the vehicle 1 and the differential of the first wheel axle 8. Between the first wheel axle 8 and an additional wheel axle 12 arranged on the load-bearing vehicle part 3 is a second propeller shaft 13 for transmitting the driving torque delivered by the drive engine 7. Each wheel axle 8, 12 is provided with wheels 14a, 14b, 15a, 15b.

The driving torque delivered by the drive engine 7 is also transmitted to a second wheel axle 16 arranged on the vehicle part 2 bearing the drive engine via a hydrostatic transmission 17. The hydrostatic transmission 17 includes a hydraulic pump 18 which is arranged on and driven by the drive engine 7, and is coupled to a hydraulic motor 19 for driving the second wheel axle 16. The second wheel axle 16 is provided with wheels 20a, 20b.

An important feature of the truck 1 according to the present invention is the distance between the individual wheel axles 8, 12, 16 and the vertical pin 4 about which the vehicle parts 2, 3 pivot in relation to one another. The first distance, distance Y, between the first wheel axle 8 and the vertical pin 4 is considerably greater than the second distance, distance X, between the second wheel axle 16 and vertical pin 4. The third and greatest distance, distance Y+Z, is the distance to the vertical pin 4 from the additional wheel axle 12 arranged on the load-bearing vehicle part 3. This results in the first wheel axle 8 and the second wheel axle 16 having considerably different turning radii in connection with cornering, as will be described below. The ratio X/Y is within the range of about 0.15 to about 0.5, and preferably is about 0.35.

Figure 2:
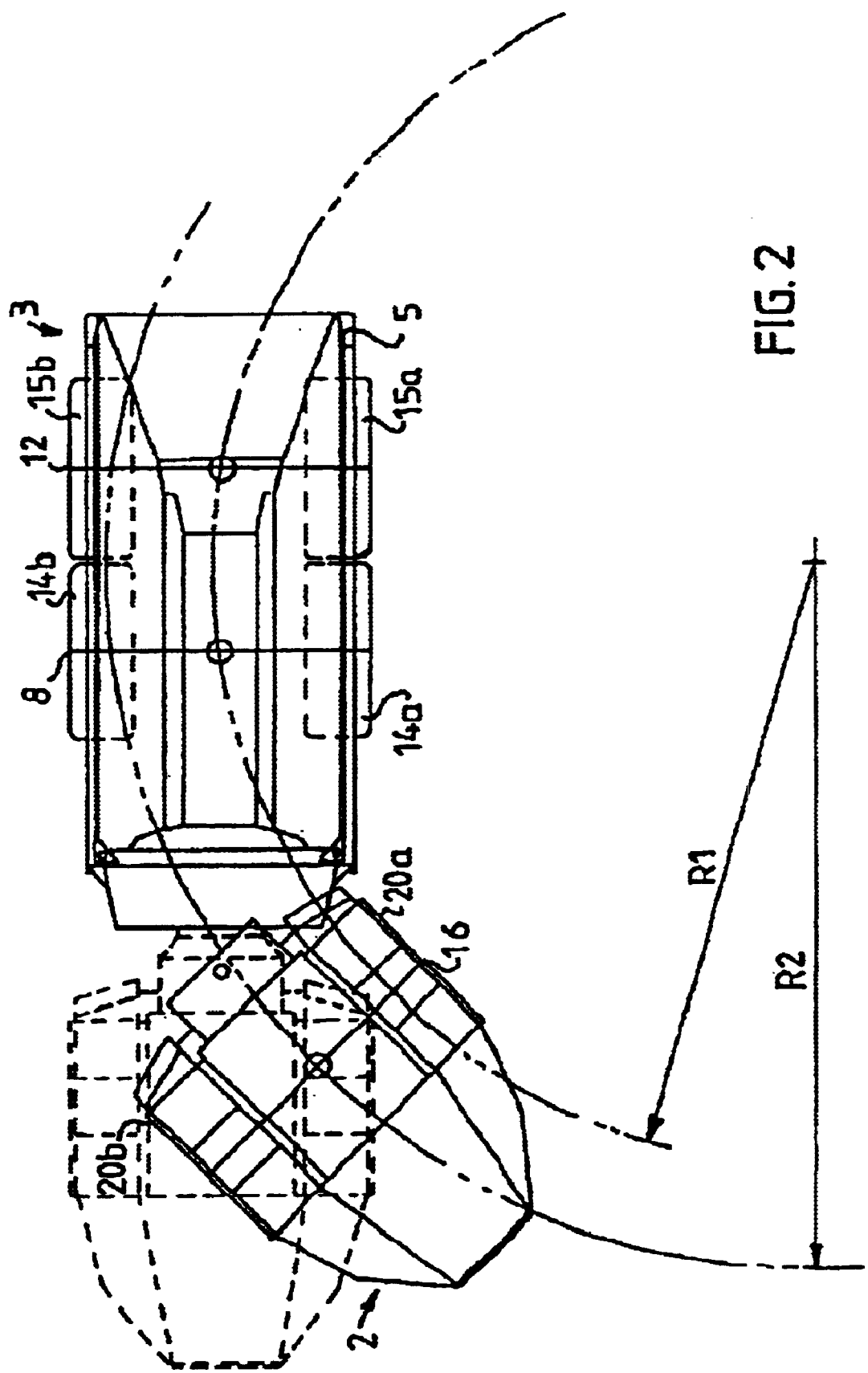
FIG. 2 is a top schematic illustration, partly in cross section, of an articulated truck according to the present invention, where the part containing the drive engine is pivoted relative to the load-bearing vehicle part in connection with cornering.

FIG. 2 shows a view from above, partly in cross section, of an articulated truck 1 according to the present invention. The vehicle part 2 bearing the drive engine is pivoted about the vertical pin 4 relative to the load-bearing vehicle part 3 when cornering. In this context, the wheel axles 8, 12 on the load-bearing vehicle part 3 follow the turning radius R1 while the second wheel axle 16 arranged on the vehicle part 2 bearing the drive engine follows the turning radius R2. Obviously, since the turning radius R2 is greater than the turning radius R1, the wheels 20a, 20b on the second wheel axle 16 must, in connection with cornering, cover a greater distance than the wheels 14a, 14b, 15a, 15b on the wheel axles 8, 12 arranged on the load-bearing vehicle part 3.

Figure 3:
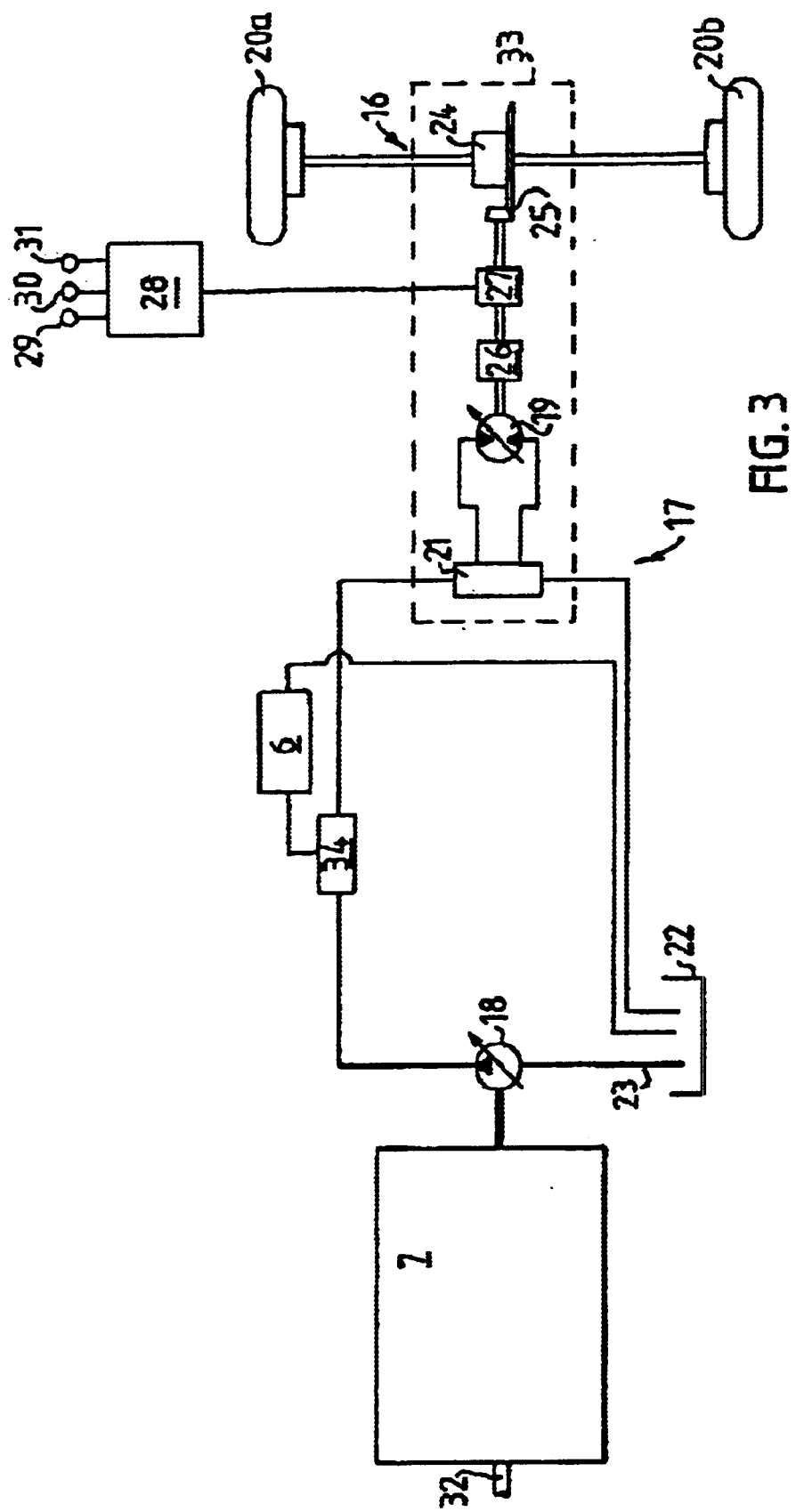
FIG. 3 shows a simplified diagram of the hydraulic, mechanical and electronic connections of a hydrostatic transmission according to the present invention.

Referring to FIG. 3, a simplified hydraulic/mechanical/electronic connection diagram for a hydrostatic transmission 17 is described below. In this context, the transmission includes an hydraulic pump 18 with variable displacement, which is driven by the drive engine 7 and is coupled, via a reverse valve 21, to a hydraulic motor 19 with variable displacement. The reverse valve 21 changes the direction of oil flow through the hydraulic motor 19, making it possible to drive the truck 1 both forwards and backwards. After the oil has passed through the hydraulic motor 19, it is led back to a tank 22 to which the suction side 23 of the hydraulic pump is coupled.

The second wheel axle 16 is provided with a lockable differential 24 arranged in association with an angle gear 25 which, via an intermediate transmission 26 (for adapting the speed of the hydraulic motor 19 to a lower speed suitable for the second wheel axle 16) and a coupling 27, is coupled to the hydraulic motor 19. Since the coupling 27 is arranged between the hydraulic motor 19 and the second wheel axle 16, the wheel axle 16 can be uncoupled when it is not required for propulsion of the truck 1. Engagement and disengagement are effected by a pneumatic operating arrangement (not shown), which in turn is controlled by an electronic control unit 28. The electronic control unit 28 controls the coupling 27 based on the driving situation, such as vehicle speed and gear, that is detected by detectors 29, 30. In the embodiment shown, the coupling 27 is arranged so as to uncouple the second wheel axle 16 when the vehicle 1 is driven at speeds in excess of 20 km/h. The second wheel axle 16 can also be uncoupled manually by the driver of the vehicle 1, such as by reversing a switch 31 arranged in the cab of the vehicle. When the second wheel axle 16 is uncoupled from the hydraulic motor 19, the truck 1 is propelled via only the mechanical transmission 9, which is connected to an output shaft 32 of the drive engine 7.

Since the reverse valve 21, hydraulic motor 19, intermediate transmission 26, coupling 27, angle gear 25 and differential 24 are integrated in a drive unit 33, a very compact and space-saving installation is obtained.

By virtue of the fact that a dividing valve is arranged on the pressure side of the hydraulic pump 18, upstream of the hydraulic motor 19, the hydraulic pump 18 also provides a source of power for the tipping cylinders 6 in connection with tipping of the container 5.

Figure 4:
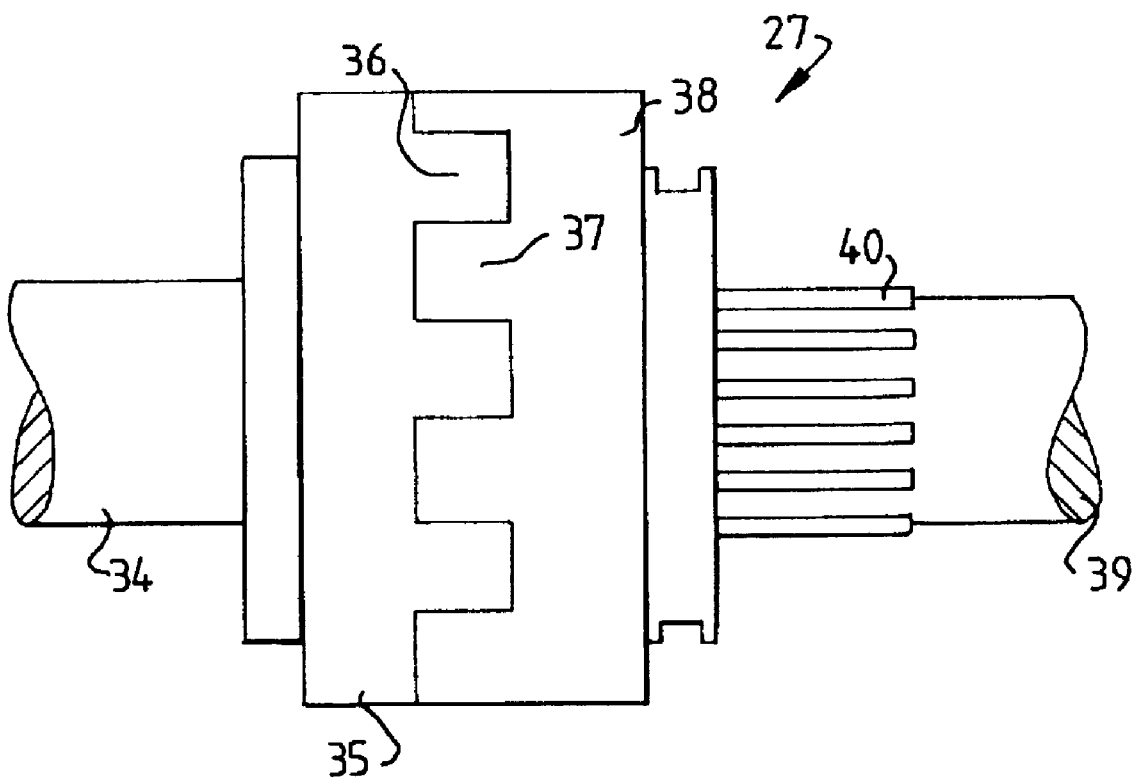
FIG. 4 shows a toothed coupling.

FIG. 4 shows a toothed coupling that can be arranged between the hydraulic motor 19 and the differential 24 of the second wheel axle 16. Since the coupling 27 is a toothed coupling, no torque whatsoever is transmitted during driving when the coupling is in the uncoupled position. The toothed coupling includes an input shaft 34 connected to the intermediate transmission 26, with an input drive wheel 35 provided with coupling teeth 36 for interacting with corresponding coupling teeth 37 on an output drive wheel 38. The output drive wheel 38 is arranged displaceably along a splined joint 40, arranged on an output shaft 39, by means of the pneumatic operating arrangement.

Other embodiments of the invention are contemplated. For example, the coupling can be in the form of a plate coupling instead of the toothed coupling described above. Furthermore, other/additional hydraulic components, such as a crane, can be coupled to the hydraulic pump.

While there has been disclosed effective and efficient embodiments of the invention using specific terms, it should be well understood that the invention is not limited to such embodiments as there might be changes made in the arrangement, disposition, and form of the parts without departing from the principle of the present invention as comprehended within the scope of the accompanying claims.

What is claimed is:

1. An articulated truck comprising:

a vehicle part housing a drive engine, and a load-bearing vehicle part, the vehicle parts being interconnected in an articulated manner about a vertical pin, the load-bearing vehicle part further comprising at least one first wheel axle driven by the drive engine via a mechanical transmission, the at least one first wheel axle being arranged at a first distance from the vertical pin, and the vehicle part housing the drive engine further comprising at least one second wheel axle driven by the drive engine, the at least one second wheel axle being arranged at a second distance from the vertical pin, wherein the at least one second wheel axle is driven via a hydrostatic transmission.

2. The articulated truck according to claim 1, the hydrostatic transmission further comprising a hydraulic pump driven by the drive engine and coupled to a hydraulic motor arranged for driving the second wheel axle, wherein the hydraulic motor is arranged in association with a differential of the second wheel axle.

3. The articulated truck according to claim 2, wherein the hydraulic pump is coupled to other hydraulic components arranged on the truck.

4. The articulated truck according to claim 3, the hydraulic components further comprising tipping cylinders arranged for tipping a container arranged on the load-bearing vehicle part.

5. The articulated truck according to claim 2, further comprising a coupling between the hydraulic motor and the second wheel axle for selective coupling of the hydraulic motor to the second wheel axle.

6. The articulated truck according to claim 5, wherein the coupling is a toothed coupling.

7. The articulated truck according to claim 5, wherein the coupling is pneumatically operated between a coupled position and an uncoupled position.

8. The articulated truck according to claim 5, further comprising a detector able to detect a driving situation wherein the coupling is able to uncouple the hydraulic motor from the second wheel axle.

9. The articulated truck according to claim 8, wherein the driving situation is the speed of the truck, and wherein the hydraulic motor is able to be uncoupled from the second wheel axle when a predetermined speed is exceeded.

10. The articulated lorry according to claim 8, wherein the driving situation is the current gear in a gearbox of the truck, and wherein the hydraulic motor is able to be uncoupled from the second wheel axle when a predetermined gear is detected.

* * * * *